United States Patent
Tsai (10) Patent No.: US 11,538,373 B2
(45) Date of Patent: Dec. 27, 2022

(54) INTERACTIVE PROJECTION SYSTEM AND INTERACTIVE DISPLAY METHOD OF PROJECTION SYSTEM

(71) Applicant: Coretronic Corporation, Hsin-Chu (TW)

(72) Inventor: Yi-Chang Tsai, Hsinchu (TW)

(73) Assignee: Coretronic Corporation, Hsin-Chu (TW)

(*) Notice: Subject to any disclaimer, the term of this patent is extended or adjusted under 35 U.S.C. 154(b) by 40 days.

(21) Appl. No.: 17/214,923

(22) Filed: Mar. 28, 2021

(65) Prior Publication Data
US 2021/0312841 A1 Oct. 7, 2021

(30) Foreign Application Priority Data
Apr. 1, 2020 (CN) .......................... 202010248382.5

(51) Int. Cl.
*G09G 3/00* (2006.01)
*G06F 3/041* (2006.01)
(Continued)

(52) U.S. Cl.
CPC ............. *G09G 3/001* (2013.01); *G06F 3/017* (2013.01); *G06F 3/041* (2013.01); *G06F 3/167* (2013.01);
(Continued)

(58) Field of Classification Search
CPC .......... G06F 3/017; G06F 3/041; G06F 3/167; G06T 3/005; G09B 5/02; G09B 23/30; G09G 3/001
See application file for complete search history.

(56) References Cited

U.S. PATENT DOCUMENTS

| | | | | |
|---|---|---|---|---|
| 1,653,180 A | * | 12/1927 | Jalbert | ................. G03B 21/606 |
| | | | | 353/28 |
| 2,158,906 A | * | 5/1939 | Netter | .................... G09B 23/30 |
| | | | | 434/273 |

(Continued)

FOREIGN PATENT DOCUMENTS

| | | |
|---|---|---|
| CN | 101298141 | 11/2008 |
| CN | 202534245 | 11/2012 |

(Continued)

OTHER PUBLICATIONS

"Office Action of Taiwan Counterpart Application", dated Jul. 28, 2021, p. 1-p. 7.

(Continued)

*Primary Examiner* — Michael Pervan
(74) *Attorney, Agent, or Firm* — JCIPRNET (57) ABSTRACT

The disclosure provides an interactive projection system and an interactive display method of the projection system. The interactive projection system includes a biologically-modeled housing, a first projection device disposed inside the biologically-modeled housing and an interactive sensing device, and a controller. The biologically-modeled housing includes a light-transmissive curved projection area. The first projection device projects the first physiological image onto the curved projection area. The interactive sensing device obtains the input signal. The controller is electrically connected to the first projection device and the interactive sensing device to identify the input signal and obtain user instructions. The controller controls the first projection device to project the second physiological image to the curved projection area according to user instructions. The first physiological image and the second physiological image display the physiological features corresponding to (Continued)

the curved projection area at a position on the biologically-modeled housing.

14 Claims, 7 Drawing Sheets

(51) Int. Cl.
    *G06F 3/01*     (2006.01)
    *G09B 5/02*     (2006.01)
    *G06T 3/00*     (2006.01)
    *G09B 23/30*     (2006.01)
    *G06F 3/16*     (2006.01)

(52) U.S. Cl.
    CPC ............. *G06T 3/005* (2013.01); *G09B 5/02* (2013.01); *G09B 23/30* (2013.01)

(56) References Cited

U.S. PATENT DOCUMENTS

| | | | | |
|---|---|---|---|---|
| 3,053,144 | A * | 9/1962 | Henry | G03B 21/60 353/7 |
| 4,978,216 | A * | 12/1990 | Liljegren | G09F 19/08 353/74 |
| 6,467,908 | B1 * | 10/2002 | Mines | G09F 19/18 353/28 |
| 8,256,904 | B2 * | 9/2012 | Reichow | G09F 19/18 352/10 |
| 8,517,543 | B2 * | 8/2013 | Reichow | G09F 19/18 353/74 |
| 9,679,500 | B2 * | 6/2017 | Welch | G03B 21/00 |
| 10,380,921 | B2 * | 8/2019 | Welch | G09B 23/34 |
| 10,410,541 | B2 * | 9/2019 | Welch | G09F 19/02 |
| 11,340,518 | B2 * | 5/2022 | Hung | H04N 9/3179 |
| 11,366,375 | B2 * | 6/2022 | Chen | G03B 21/606 |
| 2011/0151983 | A1 | 6/2011 | Edwards et al. | |
| 2012/0065478 | A1 | 3/2012 | Lin et al. | |
| 2012/0285978 | A1 * | 11/2012 | Reichow | G06Q 30/0276 221/199 |
| 2020/0001465 | A1 | 1/2020 | Shin | |

FOREIGN PATENT DOCUMENTS

| | | |
|---|---|---|
| CN | 202904986 | 4/2013 |
| CN | 103295429 | 9/2013 |
| CN | 103393403 | 11/2013 |
| CN | 103578135 | 2/2014 |
| CN | 105513475 | 4/2016 |
| CN | 105835071 | 8/2016 |
| CN | 205680344 | 11/2016 |
| CN | 206075592 | 4/2017 |
| CN | 206209686 | 5/2017 |
| CN | 106933018 | 7/2017 |
| CN | 107111894 | 8/2017 |
| CN | 107194988 | 9/2017 |
| CN | 207264653 | 4/2018 |
| CN | 207663598 | 7/2018 |
| CN | 109389669 | 2/2019 |
| CN | 109597478 | 4/2019 |
| JP | 2006212717 A * | 8/2006 |
| TW | I306051 | 2/2009 |
| TW | 201426013 | 7/2014 |
| TW | M483493 | 8/2014 |
| WO | 2017054115 | 4/2017 |

OTHER PUBLICATIONS

"Office Action of China Counterpart Application", dated Jun. 29, 2022, p. 1-p. 12.

* cited by examiner

INTERACTIVE PROJECTION SYSTEM AND INTERACTIVE DISPLAY METHOD OF PROJECTION SYSTEM

CROSS-REFERENCE TO RELATED APPLICATION

This application claims the priority benefit of China application serial no. 202010248382.5, filed on Apr. 1, 2020. The entirety of the above-mentioned patent application is hereby incorporated by reference herein and made a part of this specification.

BACKGROUND OF THE DISCLOSURE

Field of the Disclosure

The disclosure relates to a projection display technology, and in particular to an interactive projection system and an interactive display method of a projection system.

Description of Related Art

In the related art, when introducing physiological information such as human organs to students, plastic biological models are usually adopted by lecturers as commentary teaching aids. However, the painting on the surface of the plastic biological model is an unchangeable pattern and cannot display dynamic effects. Although some biological models have a detachable surface layer or superimposed accessories are adopted to show physiological anatomy structure, manual disassembly is required and the overall components for expansion are limited. In addition, if lecturers would like to provide a dynamic display effect for explanation to help students understand physiological knowledge more intuitively, typically they can only use a flat display to present a flat image. The stereoscopic sense and the sense of presence are considerably reduced.

Therefore, the industry hopes to provide a biological model that can instantly meet the needs of lecturers and change the display content in the teaching process, and this biological model can also provide dynamic/static display functions, or provide a biological model that can have interesting communication with users based on changes of the users' facial expression.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY OF THE DISCLOSURE

The disclosure provides an interactive projection system and an interactive display method of a projection system, which allows a biological model to change its display appearance along with the user's operation, and even provide dynamic images.

Other purposes and advantages of the disclosure can be further understood from the technical features disclosed in the disclosure.

In order to achieve one, part, or all of the above-mentioned purposes or other purposes, an embodiment of the disclosure provides an interactive projection system. The interactive projection system includes a biologically-modeled housing, a first projection device, an interactive sensing device, and a controller. The biologically-modeled housing includes a curved projection area, and the curved projection area is transparent. The first projection device is disposed inside the biologically-modeled housing, and is configured to project a first physiological image to the curved projection area. The interactive sensing device is arranged on the biologically-modeled housing to obtain an input signal. The controller is electrically connected to the first projection device and the interactive sensing device. The controller identifies the input signal and obtains a user instruction. The controller controls the first projection device to project a second physiological image to the curved projection area according to the user instruction. The first physiological image and the second physiological image show physiological features corresponding to the curved projection area at a position on the biologically-modeled housing.

In order to achieve one, part, all or all of the above or other purposes, an embodiment of the disclosure provides an interactive display method of a projection system, wherein the projection system includes a biologically-modeled housing. The biologically-modeled housing includes a transparent curved projection area. The interactive display method includes the following steps: projecting a first physiological image onto the curved projection area through a first projection device disposed inside the biologically-modeled housing; obtaining an input signal through an interactive sensing device; and identifying the input signal through a controller and obtaining a user instruction; controlling the first projection device to project a second physiological image to the curved projection area according to the user instruction, wherein the first physiological image and the second physiological image display physiological features corresponding to the curved projection area at a position on the biologically-modeled housing.

Based on the above, the embodiments of the disclosure have at least one of the following advantages or effects. The interactive projection system and the interactive display method of the projection system of the disclosure obtain user instructions through the interactive sensing device, and change the image projected on the curved projection area of the biologically-modeled housing according to the user instructions. In this way, a good interactive effect is provided, and the appearance of the biologically-modeled housing is changed along with the needs of users.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

It is to be understood that other embodiment may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
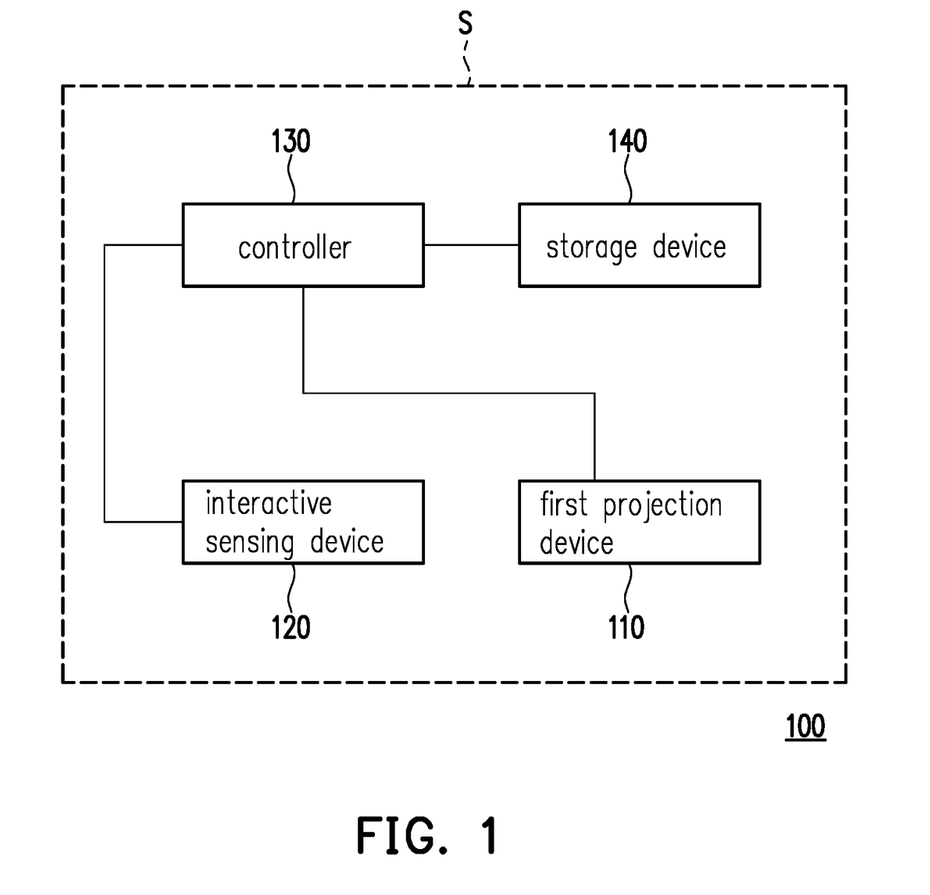
FIG. 1 is a block diagram of an interactive projection system according to an embodiment of the disclosure.
Figure 2:
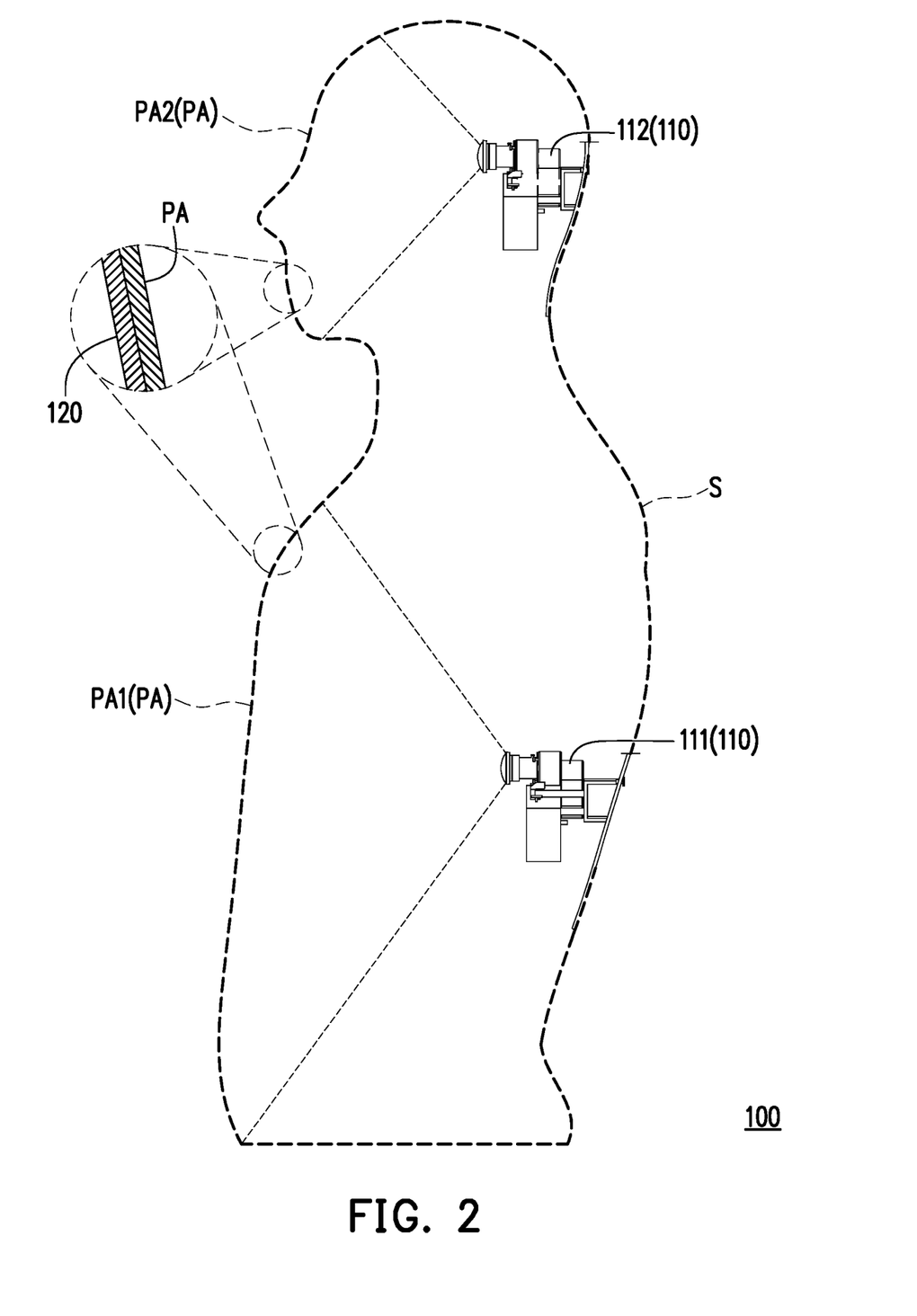
FIG. 2 is a schematic view showing the configuration of components of the interactive projection system 100 of FIG. 1.

FIG. 1 is a block diagram of an interactive projection system according to an embodiment of the disclosure. Please refer to FIG. 1, an interactive projection system 100 includes a biologically-modeled housing S, a first projection device 110, an interactive sensing device 120, a controller 130 and a storage device 140. FIG. 2 is a schematic view showing the configuration of components of the interactive projection system 100 of FIG. 1. To simplify the illustration, FIG. 2 does not show the controller 130 and the storage device 140. Please refer to FIG. 1 and FIG. 2. In order to clearly show the components inside the biologically-modeled housing S, the biologically-modeled housing S is shown by dashed lines. In this embodiment, the shape of the biologically-modeled housing S is the shape of a human-body, including a head and a body. In other embodiments, the appearance of the biologically-modeled housing S may be the shape of a partial human body, an organ, or an animal. The disclosure provides no limitation to the appearance of the biologically-modeled housing S.

Specifically, in FIG. 1, the controller 130 and the storage device 140 are disposed inside the biologically-modeled housing S, but such configuration is not necessarily required. In other embodiments, the controller 130 and the storage device 140 may be disposed on the bottom base of the biologically-modeled housing S or outside the biologically-modeled housing S, and connected with the first projection device 110 and the interactive sensing device 120 by means of wired or wireless communication. The disclosure provides no limitation to the number of the first projection device 110 and the curved projection area PA. In FIG. 2, the interactive projection system 100 is exemplified as including two first projection devices 110 (111, 112), which respectively project images onto a curved projection area PA1 and a curved projection area PA2.

The biologically-modeled housing S includes at least one curved projection area PA. The curved projection area PA is light-transmissive (e.g., translucent), and the biologically-modeled housing S may be opaque except the area of the curved projection area PA. The first projection device 110 is disposed inside the biologically-modeled housing S, and is configured to project a first physiological image to the curved projection area PA (the first physiological image show physiological features corresponding to the curved projection area PA at a position on the biologically-modeled housing S). The first projection device 110 is, for example, a rear-projection type projection device, and the curved projection area PA is, for example, a rear-projection optical film or optical plate with a curved surface.

The interactive sensing device 120 is disposed on the biologically-modeled housing S to obtain an input signal. In this embodiment, the interactive sensing device 120 is a touch panel, which is disposed at the outer side of the curved projection area PA of the biologically-modeled housing S and is conformal to the contour of the biologically-modeled housing S. The interactive sensing device 120 is configured to sense the user's touch operation and generate the input signal.

The controller 130 is electrically connected to the first projection device 110, the interactive sensing device 120 and the storage device 140. The controller 130 receives the input signal from the interactive sensing device 120 and can identify the input signal and obtain a user instruction. Then, the controller 130 controls the first projection device 110 to project a second physiological image to the curved projection area PA according to the user instruction. The first physiological image and the second physiological image show physiological features corresponding to the curved projection area PA at a position on the biologically-modeled housing S.

Specifically, the controller 130 is, for example, a central processing unit (CPU), or other programmable general-purpose and special-purpose microprocessor, digital signal processor (DSP), programmable controllers, application specific integrated circuits (ASICs) or other similar components or combinations of the above components, the disclosure is not limited thereto. The storage device 140 is, for example, a removable random access memory (RAM), a read-only memory (ROM), a flash memory, or the like, or a combination thereof. The storage device 140 is configured to store the first physiological image and the second physiological image, and other data or program codes for executing the interactive projection system 100. The first physiological image and the second physiological image may be static images or dynamic images. In other embodiments, the interactive projection system 100 can utilize, for example, a high-definition multimedia interface (HDMI), a video image array (VGA) interface, a universal serial bus (USB) interface, or a wireless connection method to receive the image data of the first physiological image and the second physiological image from an external device outside the biologically-modeled housing S.

More specifically, for the curved projection area PA1 at the chest of the biologically-modeled housing S, the curved projection area PA1 has an undulating curve of the human chest. The interactive sensing device 120 attached to the outer side of the curved projection area PA1 also has the same curve of the human chest. For the curved projection area PA2 at the face of the biologically-modeled housing S, the curved projection area PA2 has a three-dimensional undulation of facial features. The shape of the interactive sensing device 120 attached to the outer side of the curved projection area PA2 will also present the contour of facial features.

Figure 3A:
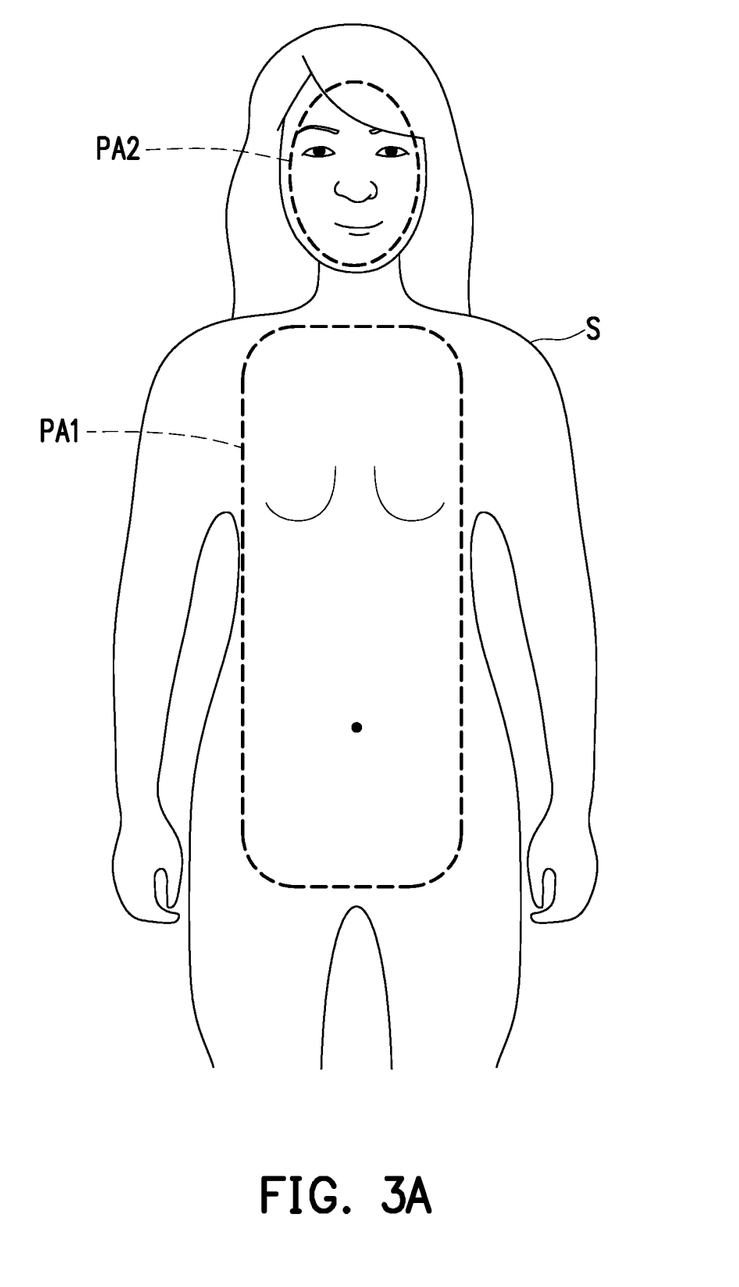
FIG. 3A is a schematic view of a first physiological image according to an embodiment of the disclosure.
Figure 3B:
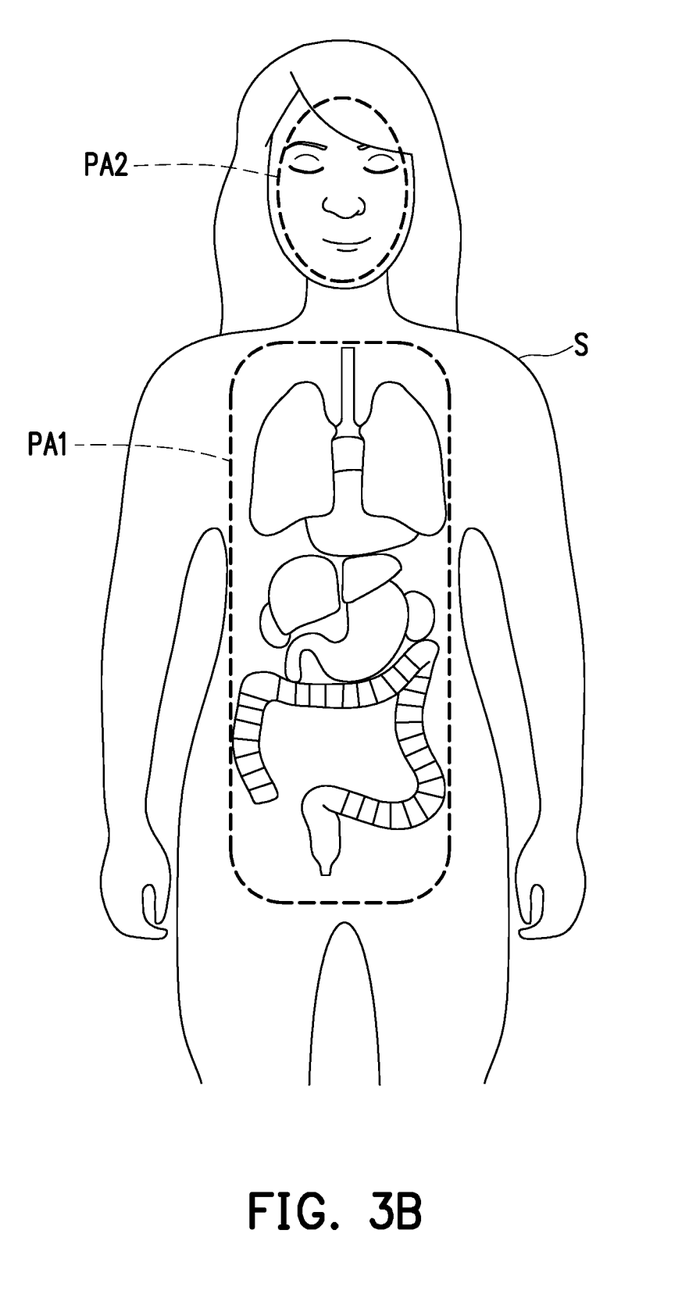
FIG. 3B is a schematic view of a second physiological image according to an embodiment of the disclosure.

FIG. 3A is a schematic view of a first physiological image according to an embodiment of the disclosure, and FIG. 3B is a schematic view of a second physiological image according to an embodiment of the disclosure. In the embodiments of FIG. 3A and FIG. 3B, the first physiological image is an appearance image of the biologically-modeled housing S and the second physiological image shows the internal physiological features of the biologically-modeled housing S. The internal physiological features are, for example, organ images, muscle group images, blood vessel images, or bone images.

Please refer to FIG. 1, FIG. 2, FIG. 3A and FIG. 3B, the first physiological image projected by the first projection device 111 is an image of human skin, and the first physiological image projected by the first projection device 112 is a facial image. Under the circumstances, the biologically-modeled housing S looks like a human model with an intact appearance (as shown in FIG. 3A). After the user clicks on the interactive sensing device 120 on the chest, the controller 130 correspondingly controls the first projection device 111 to project the second physiological image according to the touch operation. Under the circumstances, the display content of the curved projection area PA1 is changed from the appearance of the human body (FIG. 3A) into a see-through organ image (as shown in FIG. 3B), and the second physiological image is the organ image. In addition, the controller 130 may also control the first projection device 112 to correspondingly project different images. For example, in FIG. 3A, the eyes of the human model are open, while in FIG. 3B, the eyes of the human model are closed.

In short, the user can operate the interactive projection system 100 to easily change the display appearance of the human model, for example, from a human model to a human anatomical model. In this way, it is possible to avoid the trouble of conventional technology which requires manual disassembly to change the display content or the need of using several practical models with different appearances.

In other embodiments, the first physiological image and the second physiological image are images of different appearances of the biologically-modeled housing S. The controller 130 may change the facial expression or appearance of the curved projection area PA. For example, the first physiological image and the second physiological image may be appearance images of different skin colors, ages, races, or images of normal skin and allergic skin. In other embodiments, the first physiological image and the second physiological image respectively display internal physiological features corresponding to different depths of the biologically-modeled housing S. For example, the first physiological image is an image of the dermis layer, and the second physiological image is an image of subcutaneous tissue. Through touch operation, the interactive projection system 100 can show the physiological structure of the human body layer by layer. In other embodiments, the first physiological image and the second physiological image show the same organ of the biologically-modeled housing S, but the display content is different. For example, the first physiological image is an image of a normal lung, and the second physiological image is an image of the lung with disease at different levels; alternatively, the first physiological image shows the appearance of the lung, and the second physiological image shows a sectional image of the lung. In another embodiment, the first physiological image and the second physiological image projected by the first projection device 112 display different facial expressions of the human face, and can generate different facial expressions to interact with the user through the interactive sensing device 120. The disclosure provides no limitation to the display content of the first physiological image and the second physiological image.

Figure 3C:
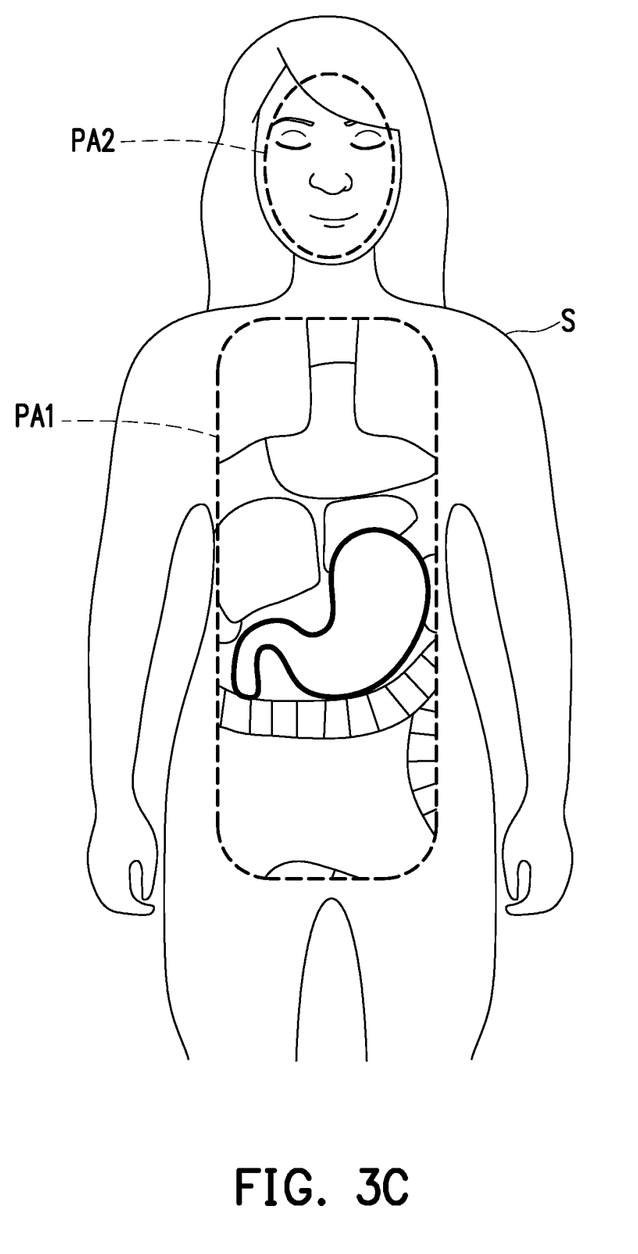
FIG. 3C is a schematic view of a second physiological image according to another embodiment of the disclosure.

In an embodiment, the controller 130 can also zoom-in or zoom-out the first physiological image to generate the second physiological image according to user instructions. FIG. 3C is a schematic view of a second physiological image according to another embodiment of the disclosure. Please refer to FIG. 1, FIG. 2, FIG. 3B and FIG. 3C, the first physiological image as shown in FIG. 3B is a visceral image of a normal human body. After the user clicks on the stomach on the touch panel (interactive sensing device 120) of the curved projection area PA1, the controller 130 controls the first projection device 111 to project the zoomed-in stomach image as the second physiological image (e.g., zoom-in the first physiological image or an close-up image), as shown in FIG. 3C.

In addition to the touch device, the interactive sensing device 120 of the disclosure may also include an image capturing device or a microphone. The image capturing device or the microphone can be arranged at any position of the biologically-modeled housing S, such as the head or throat. The disclosure provides no limitation to the type, classification and arrangement position of the interactive sensing device 120.

In an embodiment, the interactive sensing device 120 is an image capturing device, such as a charge coupled device (CCD), a camera, a TOF sensor (Time-Of-Flight sensor) or an optical sensor. The interactive sensing device 120 (such as a camera) senses the user's gesture and generates the input signal. The controller 130 identifies the input signal to obtain user instructions. Specifically, when the user's hand is swiped to the right, upward, or makes a digital gesture of 1 or 2, the controller 130 captures the user's gesture image (e.g., captures the continuous image of gesture change) through the interactive sensing device 120, and determines that the user wants the first projection device 110 to project the second physiological image based on the gesture image.

In an embodiment, the interactive sensing device 120 is a microphone. The interactive sensing device 120 receives the user's voice and generates an input signal. The controller 130 identifies the input signal to obtain user instructions. Specifically, when the user says "zoom-in", the interactive sensing device 120 (microphone) receives the user's voice and transmits the input signal to the controller 130, and the controller 130 obtains the user's instruction (zoom-in) through voice recognition. Therefore, the display image is correspondingly zoomed-in, for example, as the embodiments shown in FIG. 3B and FIG. 3C.

In an embodiment, the controller 130 can also determine the target physiological structure of the user through the interactive sensing device 120 and mark the target physiological structure in the first physiological image or the second physiological image. For example, when the controller 130 determines that the user's target physiological structure is the heart according to the user's instruction, the first projection device 110 can highlight the target physiological structure by changing the color of the heart, flashing the heart image, or using special marks at the heart, so that other viewers can clearly see that the currently described target is the heart. Alternatively, the first projection device 110 projects another image which shows the beating of the heart while other organs remain static. In another embodiment, the first physiological image shows the appearance of an organism. When the user selects the position where the lung is located in the body, in the second physiological image, the other parts remain the same display appearance while the lung is see-through at the position of the lung.

In short, the interactive sensing device 120 can generate an input signal by sensing any one of the user's touch operations, gestures, or voices or a combination thereof, and the controller 130 determines the user instructions according to the input signal, such as the user's touch position, zoom-in or zoom-out image, target physiological structure to be selected or display content to be switched, etc. By utilizing the interactive sensing device 120 and the first projection device 110, the user can change the display content in real time to adapt to the teaching content or lecture, thereby displaying dynamic or static pathological analysis or physiological features. Since the first physiological image and the second physiological image of the disclosure are projected on the surface of the three-dimensional biologically-modeled housing S, and the display content will reflect the physiological structure of the projected position, the viewer can understand the physiological structure of organism more intuitively, which facilitates teaching; or the user(s) can get a good interactive effect.

Figure 4:
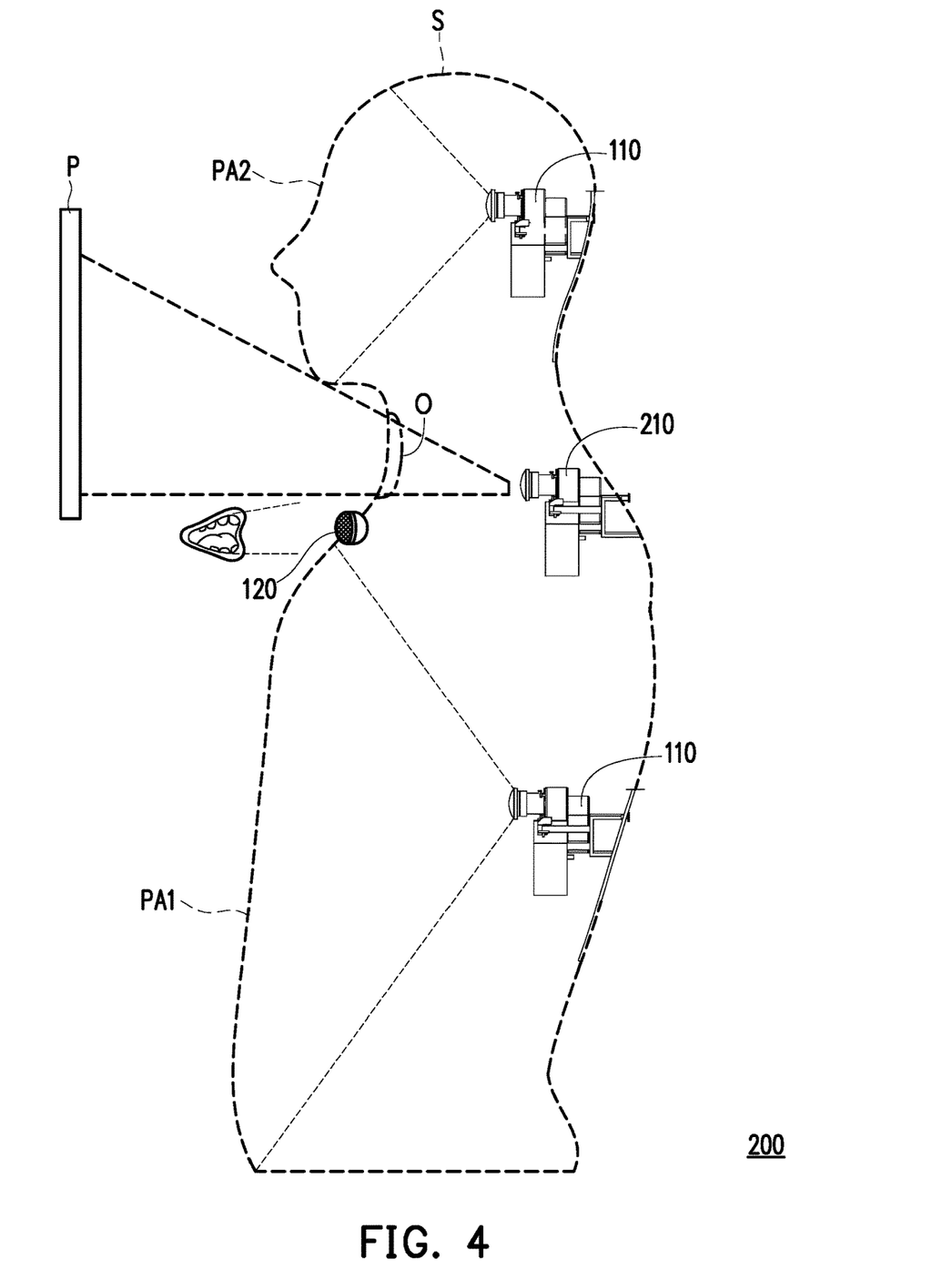
FIG. 4 is a schematic view of an interactive projection system according to another embodiment of the disclosure.

FIG. 4 is a schematic view of an interactive projection system according to another embodiment of the disclosure. Please refer to FIG. 1 and FIG. 4. The interactive projection system 200 is similar to the interactive projection system 100 except that the interactive projection system 200 further includes a second projection device 210. The interactive projection system 200 can equally implement the above embodiments. The second projection device 210 is disposed inside the biologically-modeled housing S. The controller 130 controls the second projection device 210 to project the third physiological image according to the user instruction.

The biologically-modeled housing S further includes a projection opening O. The projection opening O is, for example, a hole corresponding to the size of an image beam on the biologically-modeled housing S. The second projection device 210 is, for example, a front-projection projector. The third physiological image is projected through the projection opening O onto the display surface P outside the biologically-modeled housing S, such as a projection screen or a wall. In FIG. 4, the user says "outer projection" to the microphone (interactive sensing device 120), and the controller 130 correspondingly controls the second projection device 210 to project the third physiological image onto the display surface P. The third physiological image may be the display content of the first physiological image or the second physiological image, or may be other supplementary information. The user supplements the description or displays clearer image content through the third physiological image projected by the second projection device 210. The disclosure provides no limitation to the display content of the third physiological image.

Specifically, the first physiological image and the second physiological image are configured to be projected on a curved surface, while the third physiological image can be projected on a flat surface, so the first physiological image and the second physiological image need to be deformed or distorted in advance as compared to the third physiological image.

Figure 5:
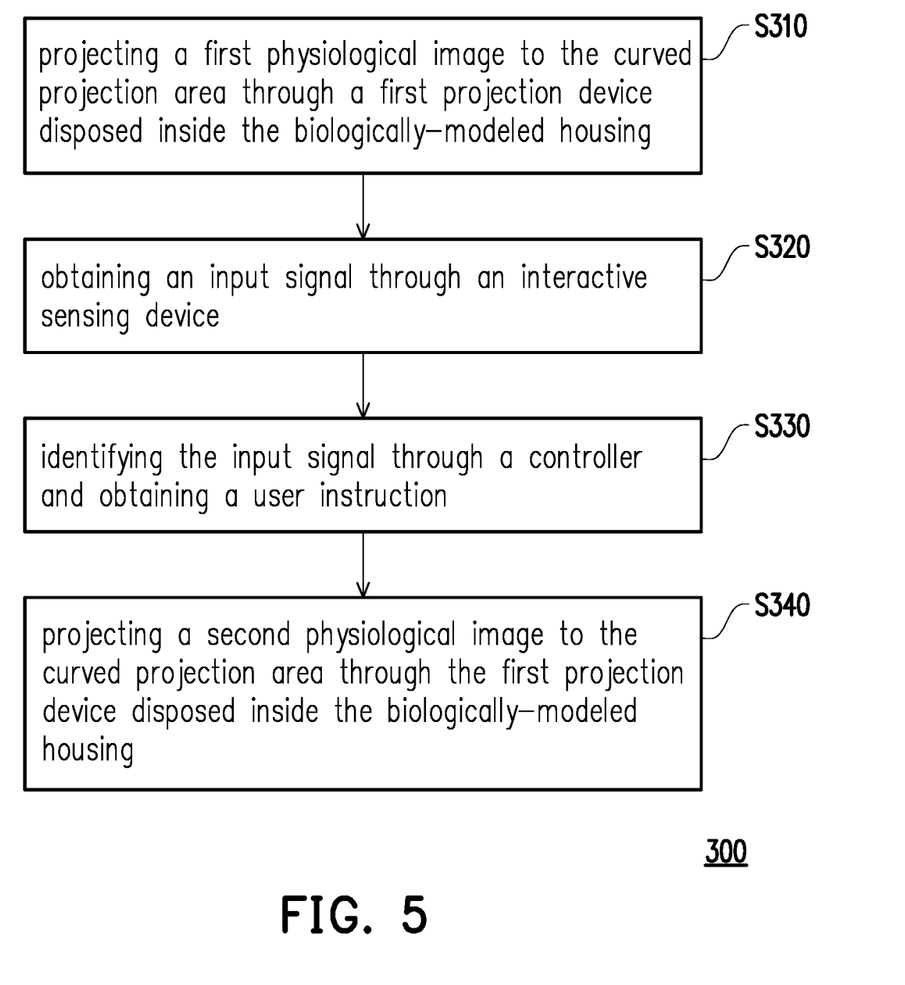
FIG. 5 is a flowchart of an interactive display method of a projection system according to an embodiment of the disclosure.

FIG. 5 is a flowchart of an interactive display method of a projection system according to an embodiment of the disclosure. The interactive display method 300 can be applied to the interactive projection system 100 and the interactive projection system 200 described above. The steps of the interactive display method 300 are described below with the reference symbols used in the above embodiments.

In step S310, the first physiological image is projected onto the curved projection area PA by the first projection device 110 disposed inside the biologically-modeled housing S. In step S320, the input signal is obtained through the interactive sensing device 120. In step S330, the controller 130 identifies the input signal obtained in step S320 and obtains a user instruction. Finally, in step S340, the controller 130 controls the first projection device 110 to project the second physiological image to the curved projection area PA according to the user instruction, wherein the first physiological image and the second physiological image display physiological features corresponding to the curved projection area PA at a position on the biologically-modeled housing S.

The implementation details of the interactive display method 300 are sufficiently suggested, taught or explained in the embodiments of FIG. 1 to FIG. 4, and related details are not repeated herein.

In summary, the embodiments of the disclosure have at least one of the following advantages or effects. The interactive projection system and the interactive display method of the projection system of the disclosure can sense the user's touch operation, gestures or voice through the interactive sensing device to change the display content of the biologically-modeled housing in the curved projection area, thereby saving the trouble of manual replacement by the user while also providing dynamic display effects. In addition, the image projected in the curved projection area will correspond to the physiological features at the position, so that the viewer can more intuitively understand the physiological structure of the organism.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the present disclosure is intended to be dedicated to the public regardless of whether the element or component is explicitly recited in the following claims.

What is claimed is:

1. An interactive projection system, comprising a biologically-modeled housing, a first projection device, an interactive sensing device, and a controller; wherein,
the biologically-modeled housing comprises a curved projection area, and the curved projection area is light-transmissive;
the first projection device is disposed inside the biologically-modeled housing, and is configured to project a first physiological image to the curved projection area;
the interactive sensing device is disposed on the biologically-modeled housing to obtain an input signal; and
the controller is electrically connected to the first projection device and the interactive sensing device, the controller identifies the input signal and obtains a user instruction, wherein the controller is configured to control the first projection device to project a second physiological image onto the curved projection area according to the user instruction,
wherein the first physiological image and the second physiological image display physiological features corresponding to the curved projection area at a position on the biologically-modeled housing,
wherein the controller determines a target physiological structure of a user through the interactive sensing device, and marks the target physiological structure in the first physiological image or the second physiological image.

2. The interactive projection system according to claim 1, wherein an appearance of the biologically-modeled housing is a shape of a human body, an organ, or an animal.

3. The interactive projection system according to claim 1, wherein the interactive sensing device is a touch panel, which is disposed at an outer side the curved projection area of the biologically-modeled housing and is conformal to a contour of the biologically-modeled housing, wherein the interactive sensing device senses the user's touch operation and generates the input signal, and the controller identifies the input signal to obtain the user instruction.

4. The interactive projection system according to claim 1, wherein the interactive sensing device is an image capturing device, wherein the interactive sensing device senses a user's gesture and generates the input signal, the controller identifies the input signal to obtain the user instruction.

5. The interactive projection system according to claim 1, wherein the interactive sensing device is a microphone, wherein the interactive sensing device receives a user's voice and generates the input signal, and the controller identifies the input signal to obtain the user instruction.

6. The interactive projection system according to claim 1, wherein the interactive projection system further comprises a storage device, wherein,
the storage device is configured to store the first physiological image and the second physiological image, the storage device is coupled to the controller,
wherein the first physiological image and the second physiological image are different appearance images of the biologically-modeled housing, or the first physiological image displays the appearance image of the biologically-modeled housing and the second physiological image displays an internal physiological feature of the biologically-modeled housing, or the first physiological image and the second physiological image respectively display internal physiological features corresponding to different depths of the biologically-modeled housing, or the first physiological image and the second physiological image display the same organ of the biologically-modeled housing, but the display content is different.

7. An interactive projection system, comprising a biologically-modeled housing, a first projection device, an interactive sensing device, and a controller; wherein,
the biologically-modeled housing comprises a curved projection area, and the curved projection area is light-transmissive;
the first projection device is disposed inside the biologically-modeled housing, and is configured to project a first physiological image to the curved projection area;
the interactive sensing device is disposed on the biologically-modeled housing to obtain an input signal; and
the controller is electrically connected to the first projection device and the interactive sensing device, the controller identifies the input signal and obtains a user instruction, wherein the controller is configured to control the first projection device to project a second physiological image onto the curved projection area according to the user instruction,
wherein the first physiological image and the second physiological image display physiological features corresponding to the curved projection area at a position on the biologically-modeled housing, wherein the controller zooms-in or zooms-out the first physiological image according to the user instruction to generate the second physiological image.

8. An interactive projection system, comprising a biologically-modeled housing, a first projection device, a second projection device, an interactive sensing device, and a controller; wherein,
the biologically-modeled housing comprises a curved projection area, and the curved projection area is light-transmissive;
the first projection device is disposed inside the biologically-modeled housing, and is configured to project a first physiological image to the curved projection area;
the interactive sensing device is disposed on the biologically-modeled housing to obtain an input signal; and
the controller is electrically connected to the first projection device and the interactive sensing device, the controller identifies the input signal and obtains a user instruction, wherein the controller is configured to control the first projection device to project a second physiological image onto the curved projection area according to the user instruction,
wherein the first physiological image and the second physiological image display physiological features corresponding to the curved projection area at a position on the biologically-modeled housing, wherein,
the second projection device is disposed inside the biologically-modeled housing, the biologically-modeled housing comprises a projection opening, the controller controls the second projection device to project a third physiological image according to the user instruction, wherein the third physiological image is projected onto a display surface outside the biologically-modeled housing through the projection opening.

9. An interactive display method of a projection system, the projection system comprising a biologically-modeled housing, and the biologically-modeled housing comprising a light-transmissive curved projection area, wherein the interactive display method comprises:
projecting a first physiological image to the curved projection area through a first projection device disposed inside the biologically-modeled housing;

obtaining an input signal through an interactive sensing device;

identifying the input signal through a controller and obtaining a user instruction;

controlling, by the controller, the first projection device to project a second physiological image to the curved projection area according to the user instruction; and determining a target physiological structure of a user through the interactive sensing device, and marking the target physiological structure in the first physiological image or the second physiological image, wherein the first physiological image and the second physiological image display physiological features corresponding to the curved projection area at a position on the biologically-modeled housing.

10. The interactive display method according to claim 9, wherein an appearance of the biologically-modeled housing is a shape of a human body, an organ, or an animal.

11. The interactive display method according to claim 9, wherein the first physiological image and the second physiological image are different appearance images of the biologically-modeled housing, or the first physiological image displays the appearance image of the biologically-modeled housing and the second physiological image displays an internal physiological feature of the biologically-modeled housing, or the first physiological image and the second physiological image respectively display internal physiological features corresponding to different depths of the biologically-modeled housing, or the first physiological image and the second physiological image display the same organ of the biologically-modeled housing, but the display content is different.

12. The interactive display method according to claim 9, wherein the step of obtaining the input signal through the interactive sensing device comprises:

sensing, by the interactive sensing device, the user's touch operation, gesture or voice and generating the input signal.

13. An interactive display method of a projection system, the projection system comprising a biologically-modeled housing, and the biologically-modeled housing comprising a light-transmissive curved projection area, wherein the interactive display method comprises:

projecting a first physiological image to the curved projection area through a first projection device disposed inside the biologically-modeled housing;

obtaining an input signal through an interactive sensing device;

identifying the input signal through a controller and obtaining a user instruction; and controlling, by the controller, the first projection device to project a second physiological image to the curved projection area according to the user instruction, wherein the first physiological image and the second physiological image display physiological features corresponding to the curved projection area at a position on the biologically-modeled housing, wherein the step of controlling the first projection device to project the second physiological image to the curved projection area by the controller according to the user instruction comprises:

zooming-in or zooming-out the first physiological image according to the user instruction to generate the second physiological image.

14. An interactive display method of a projection system, the projection system comprising a biologically-modeled housing, and the biologically-modeled housing comprising a light-transmissive curved projection area, wherein the interactive display method comprises:

projecting a first physiological image to the curved projection area through a first projection device disposed inside the biologically-modeled housing;

obtaining an input signal through an interactive sensing device;

identifying the input signal through a controller and obtaining a user instruction;

controlling, by the controller, the first projection device to project a second physiological image to the curved projection area according to the user instruction; and controlling, by the controller, a second projection device disposed inside the biologically-modeled housing to project a third physiological image according to the user instruction, wherein the third physiological image is projected through an projection opening disposed on the biologically-modeled housing onto a display surface outside the biologically-modeled housing, wherein the first physiological image and the second physiological image display physiological features corresponding to the curved projection area at a position on the biologically-modeled housing.

\* \* \* \* \*